(12) United States Patent
Lee et al.

(10) Patent No.: US 10,605,364 B2
(45) Date of Patent: Mar. 31, 2020

(54) PARKING APPARATUS FOR VEHICLE (71) Applicants: Hyundai Motor Company, Seoul (KR); Kia Motors Corporation, Seoul (KR)

(72) Inventors: Jang Mi Lee, Yongin-si (KR); Min Sung Kim, Seoul (KR); Wan Soo Kim, Hwaseong-si (KR); Bung Chul Rim, Yongin-si (KR); Kyung Ha Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 263 days.

(21) Appl. No.: 15/795,908

(22) Filed: Oct. 27, 2017

(65) Prior Publication Data

US 2018/0238447 A1  Aug. 23, 2018

(30) Foreign Application Priority Data

Feb. 22, 2017 (KR) .......................... 10-2017-0023661

(51) Int. Cl.
*F16H 63/34* (2006.01)
*F16H 63/38* (2006.01)

(52) U.S. Cl.
CPC ......... *F16H 63/3433* (2013.01); *F16H 63/38* (2013.01); *F16H 2312/12* (2013.01)

(58) Field of Classification Search
CPC .. F16H 63/3433; F16H 63/38; F16H 2312/12; B60T 1/005
See application file for complete search history.

(56) References Cited

U.S. PATENT DOCUMENTS

| 5,964,335 A * | 10/1999 | Taniguchi | ............... B60T 1/005 |
| | | | 192/219.5 |
| 9,777,836 B1 * | 10/2017 | Lee | ...................... F16H 63/3475 |
| 2007/0283735 A1 * | 12/2007 | Schweiher | .......... F16H 63/3433 |
| | | | 70/245 |

(Continued)

FOREIGN PATENT DOCUMENTS

| KR | 10-0534840 B1 | 12/2005 |
| KR | 10-0795356 B1 | 1/2008 |

(Continued)

*Primary Examiner* — Jacob S. Scott
*Assistant Examiner* — Lori Wu
(74) *Attorney, Agent, or Firm* — Morgan, Lewis & Bockius LLP (57) ABSTRACT A vehicle parking apparatus may include a parking rod having a first end portion connected to a detent plate and a second end portion on which a cam is placed, the parking rod rectilinearly moving in accordance with rotation of the detent plate and causing the cam to rotate a sprag about a rotation shaft; and a 'U'-shaped stopper extending from the second end portion of the parking rod and operating to surround or release the sprag in accordance with the motion of the parking rod, the stopper allowing rotation of the sprag by releasing the sprag when the detent plate is rotated to a P range position and preventing the rotation of the sprag by surrounding the sprag when the detent plate is rotated to a certain range position other than the P range position.

6 Claims, 6 Drawing Sheets (56) References Cited

U.S. PATENT DOCUMENTS

2013/0284559 A1* 10/2013 Barton .................... B60T 1/062
 192/219.5
2015/0267811 A1* 9/2015 Kristofcsak ......... F16H 63/3433
 192/219.5

FOREIGN PATENT DOCUMENTS

| KR | 10-0941242 B1 | 2/2010 |
|---|---|---|
| KR | 10-2012-0061665 A | 6/2012 |

* cited by examiner

PARKING APPARATUS FOR VEHICLE

CROSS REFERENCE TO RELATED APPLICATION

The present application claims priority to Korean Patent Application No. 10-2017-0023661, filed Feb. 22, 2017, the entire contents of which is incorporated herein for all purposes by this reference.

BACKGROUND OF THE INVENTION

Field of the Invention

The present invention generally relates to a vehicle parking apparatus configured not to be accidently operated by vertical vibrations of a vehicle while the vehicle is running with a transmission shifting from one range to another except for P range.

Description of Related Art

Generally, a parking mechanism for a vehicle is provided in a transmission. When a driver manipulates a transmission shift lever to be shifted into P range, a sprag is engaged with a parking gear by being moved by a cam mounted to a parking rod, thereby locking driving wheels.

The sprag stays disengaged from the parking gear mainly due to a return spring. The sprag is engaged with the parking gear until the transmission shift lever is shifted into P range and the cam pushes up the sprag and generates rotation force.

However, the engine compartment structure of recently developed electric vehicles differs from that of gasoline vehicles. Therefore, even though the transmission of electric vehicles is provided with a return spring that is conventionally provided to the transmission of gasoline vehicles, ratcheting in which a sprag is engaged with a parking gear by severe vehicle vibrations occurs.

One plausible solution to this problem is to increase the stiffness of a return spring. However, the increased stiffness of a return spring leads to an increase in parking operation force. Therefore, when this solution is applied to a vehicle provided with a shift by wire (SBW) system, the power of an actuator motor needs to be increased, which results in increases in price, volume, and power consumption of the actuator motor. That is, vehicle operation efficiency deteriorates.

Another plausible solution is a method of increasing the rigidity of each mounting part to reduce vehicle's vibrations. However, this solution has a problem that vehicle's response and drivability are deteriorated and the development period of vehicles is lengthened.

The present invention generally relates to a vehicle parking apparatus configured not to be accidently operated by vertical vibrations of a vehicle while the vehicle is running with a transmission shifting from one range to another except for P range.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle parking apparatus configured for preventing a sprag from being engaged with a parking gear by vibrations of a vehicle in a vehicle driving state in which a transmission shifts from one range to another except for P range by adding a stopper to a parking rod.

Various aspects of the present invention are directed to providing a vehicle parking apparatus including: a parking rod having a first end portion connected to a detent plate and a second end portion on which a cam is placed, the parking rod rectilinearly moving in accordance with rotation of the detent plate and causing the cam to rotate a sprag about a rotation shaft; and a 'U'-shaped stopper extending from the second end portion of the parking rod and operating to surround or release the sprag in accordance with the motion of the parking rod, the stopper allowing rotation of the sprag by releasing the sprag when the detent plate is rotated to a P range position and preventing the rotation of the sprag by surrounding the sprag when the detent plate is rotated to a certain range position other than the P range position.

The parking rod and the sprag may be disposed to be perpendicular to each other.

A distance between internal walls of the 'U'-shaped stopper, the internal walls facing each other, may be greater than a width of the sprag.

A difference between the distance between the internal walls of the 'U'-shaped stopper and the width of the sprag may be smaller than a predetermined distance that is a distance between a first position at which the sprag is fully disengaged from the parking gear and a second position at which the sprag starts to be engaged with the parking gear.

When the detent plate is rotated to the P range position, the stopper moves to a foremost position in accordance with the motion of the parking rod, and the sprag is released from the stopper and rotated in one direction by the cam, being engaged with the parking gear.

The stopper may have a cross section area greater than that of the second end portion of the parking rod to prevent the cam from escaping from the parking rod.

As to the sprag, a rear corner of an upper end portion thereof which is a portion to be pushed by the cam and a front corner of a lower end portion thereof may be chamfered.

The vehicle parking apparatus having the structure described above can prevent ratcheting in which a sprag is engaged with a parking gear, even when a vehicle severely vertically vibrates in a state in which a transmission shift lever is not positioned at P range.

Therefore, abrasion or scratching of a sprag, a parking gear, and a cam is prevented and thus durability of a vehicle parking device is improved.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the certain principles of the invention. The specific design features of the present invention as included herein, including, for example, specific dimensions, orientations, locations, and shapes will be determined in part by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, a vehicle parking apparatus according to exemplary embodiments of the present invention will be described in detail with reference to the accompanying drawings.

Figure 1:
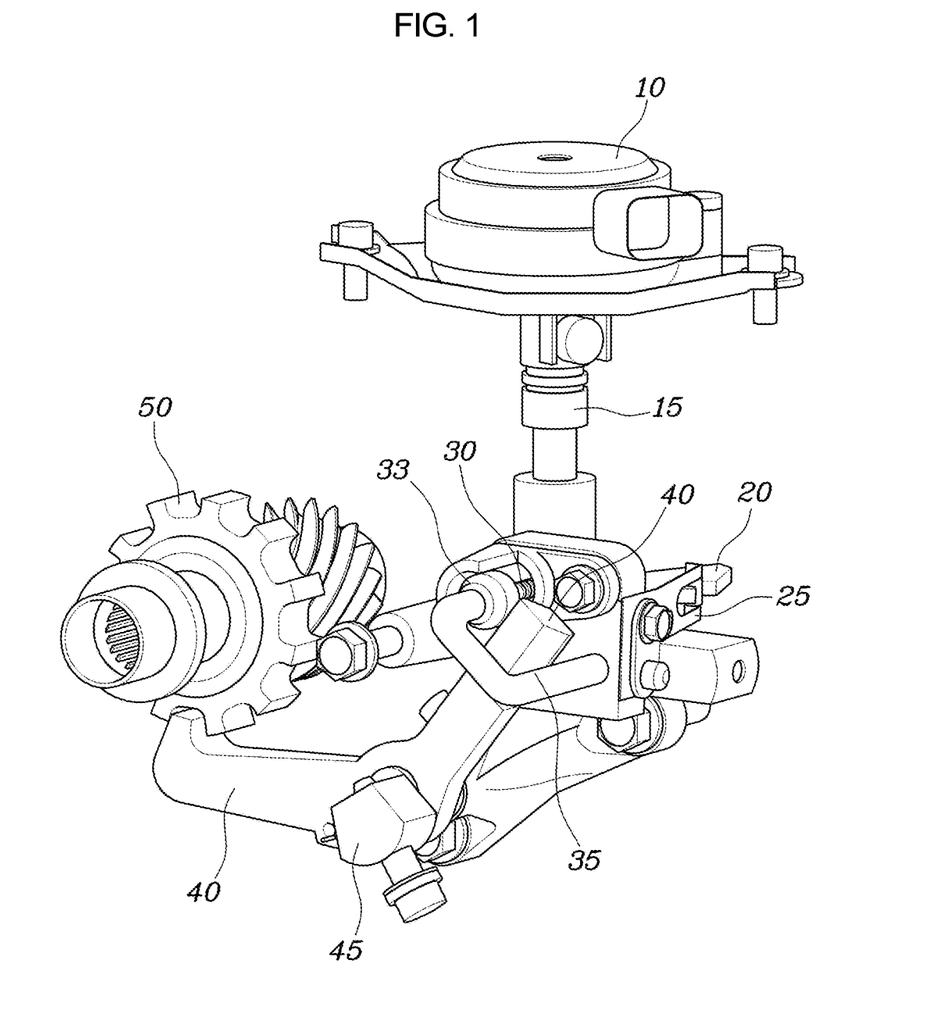
FIG. 1 is a perspective view illustrating the layout of a vehicle parking apparatus according to one exemplary embodiment of the present invention.
Figure 2:
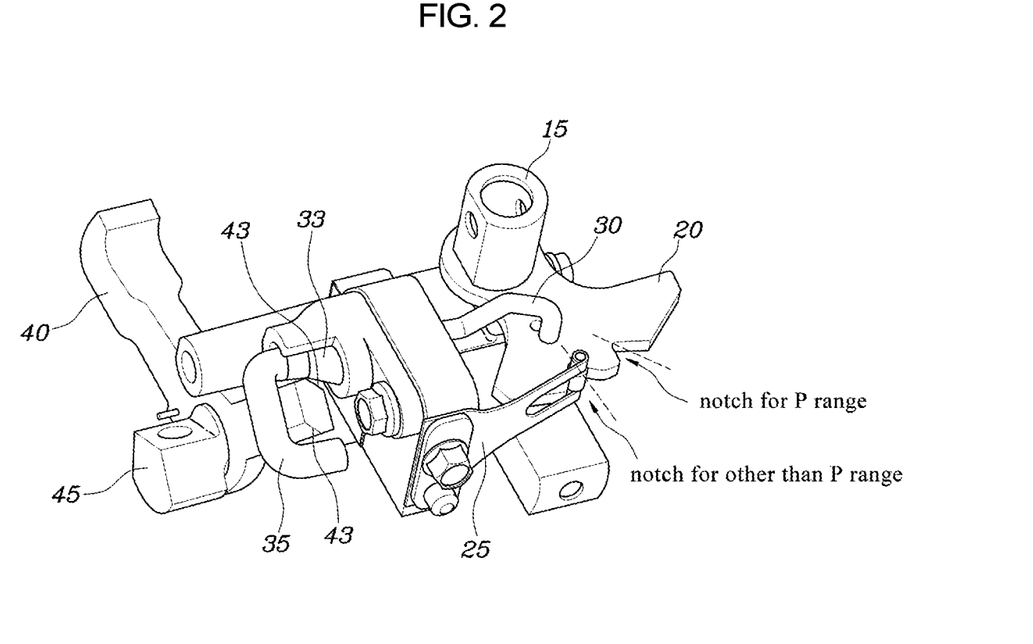
FIG. 2 is a perspective view illustrating the vehicle parking apparatus according to one exemplary embodiment of the present invention.
Figure 3:
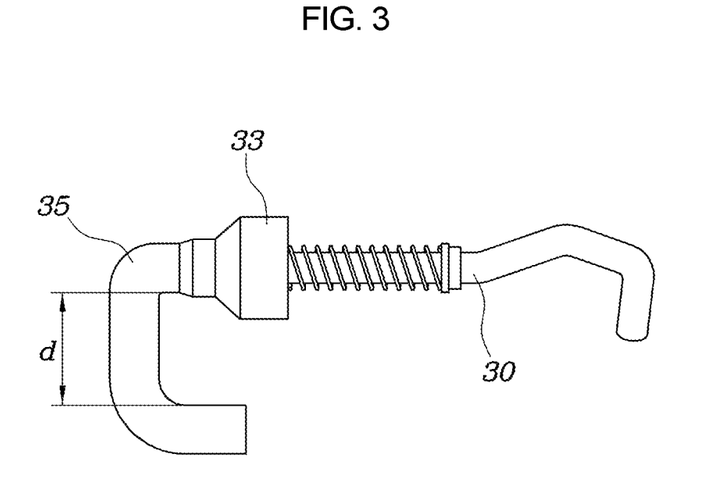
FIG. 3 is a diagram illustrating the construction of a parking rod and a stopper according to one exemplary embodiment of the present invention.
Figure 4:
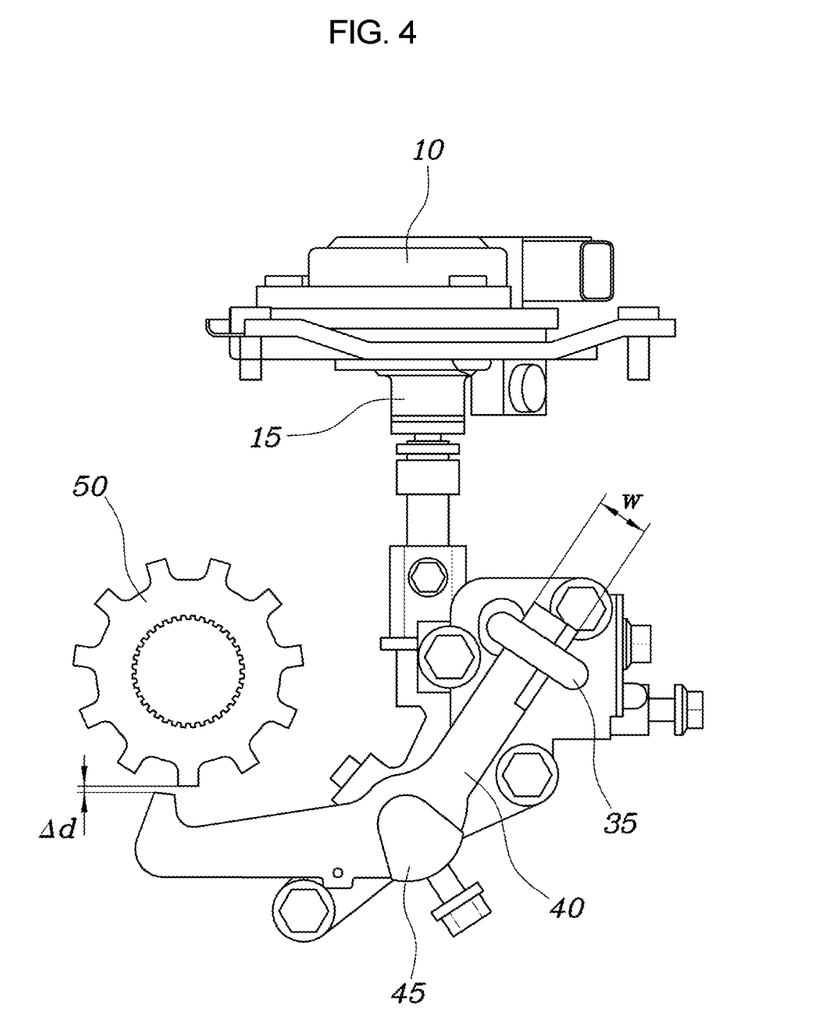
FIG. 4 and FIG. 5 are front views illustrating operation of the vehicle parking apparatus according to one exemplary embodiment of the present invention.
Figure 5:
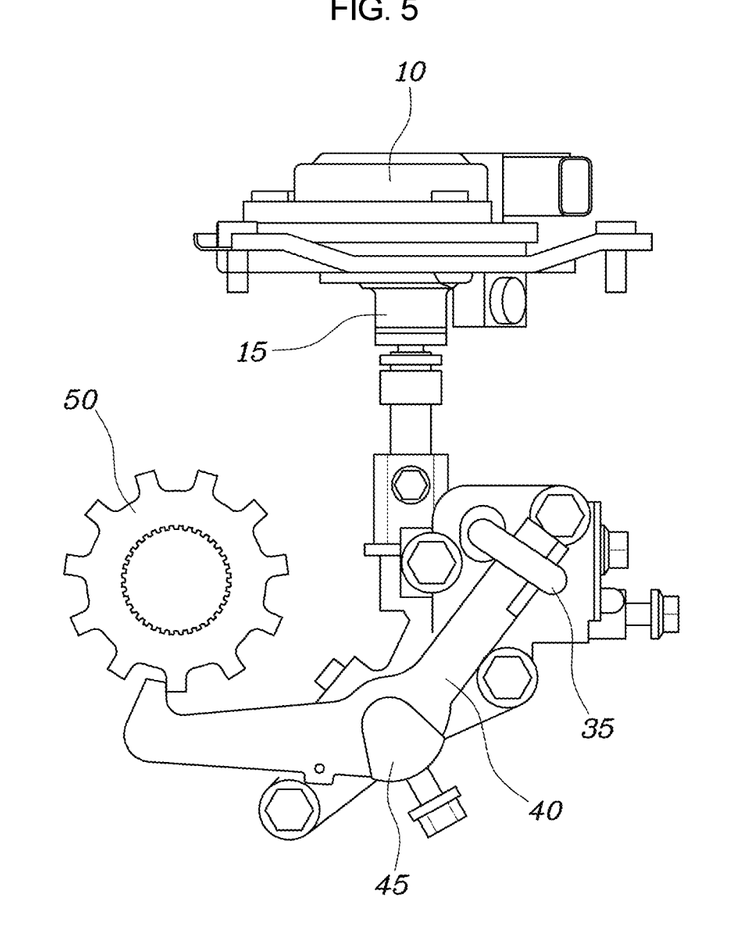
Figure 6:
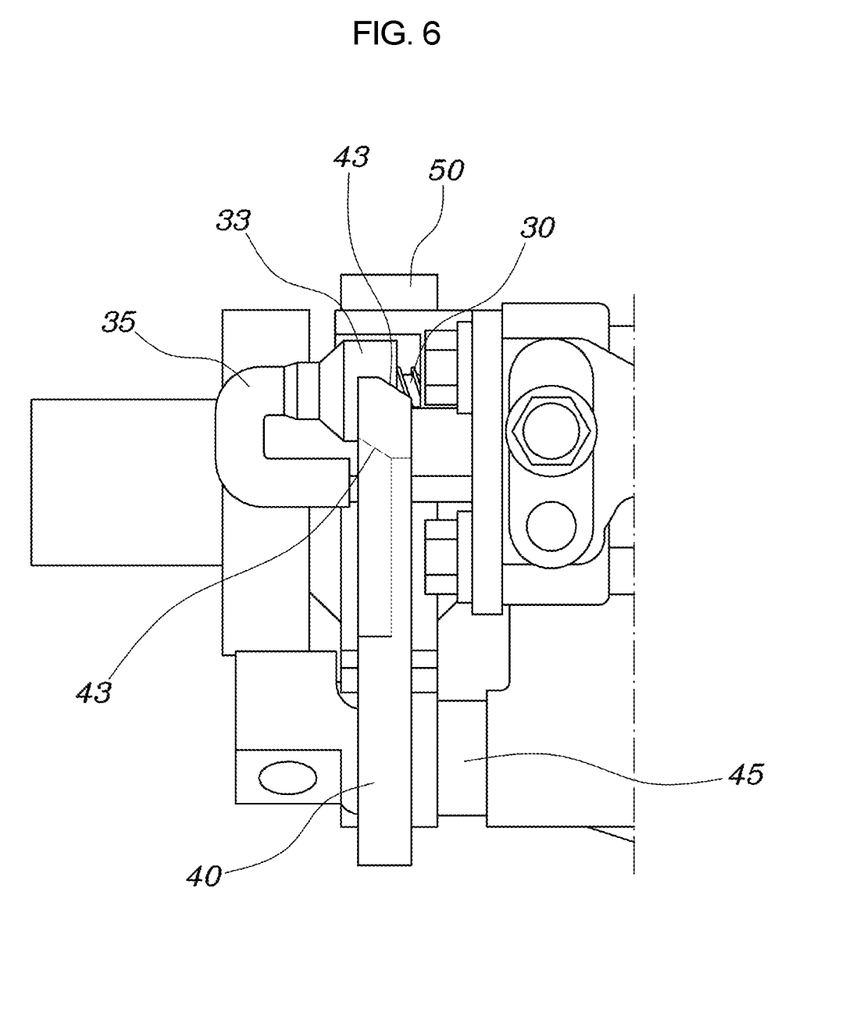
FIG. 6 is a side view illustrating the vehicle parking apparatus according to one exemplary embodiment of the present invention.

FIG. 1 is a perspective view illustrating the layout of a vehicle parking apparatus according to one exemplary embodiment of the present invention; FIG. 2 is a perspective view illustrating the vehicle parking apparatus according to one exemplary embodiment of the present invention; FIG. 3 is a diagram illustrating the construction of a parking rod and a stopper according to one exemplary embodiment of the present invention; FIG. 4 and FIG. 5 are front views illustrating operation of the vehicle parking apparatus according to one exemplary embodiment of the present invention; and FIG. 6 is a side view illustrating the vehicle parking apparatus according to one exemplary embodiment of the present invention.

With reference to FIG. 1, FIG. 2, and FIG. 3, a vehicle parking apparatus according to one exemplary embodiment of the present invention includes a parking rod 30 and a 'U'-shaped stopper 35. The parking rod has one end portion (hereinafter referred to as a first end portion) connected to a detent plate 20 and the other end portion (hereinafter referred to as a second end portion) on which a cam 33 is placed. The parking rod 30 is rectilinearly moved in accordance with rotation of the detent plate 20. At this point, the cam 33 rotates a sprag 40 about a rotation shaft 45. The 'U'-shaped stopper 35 extends from the second end portion of the parking rod 30. The stopper 35 is configured to surround or release the sprag 40 in accordance with the movement of the parking rod 30. The stopper 35 allows rotation of the sprag 40 when the detent plate 20 is rotated to a P range position by releasing the sprag 40 and prevents the rotation of the sprag 40 by surrounding the sprag 40 when detent plate 20 is rotated to a certain range position other than the P range position.

In the transmission of an electric vehicle, the detent plate 20 is connected to a central shaft 15 of an actuator 10 and is thus controlled in accordance with motion of the actuator 10. That is, a transmission control device detects the position of a transmission shift lever and operates the actuator 10 in accordance with the detected range at which the transmission shift lever is positioned. The transmission control device controls operation of a vehicle parking apparatus in this way.

For example, the operation of the vehicle parking apparatus will be described with reference to a case where the transmission shift lever is manipulated to be shifted into P range. The transmission control device detects a driver's manipulation of shifting the transmission shift lever into P range, and accordingly drives the actuator 10 to rotate the detent plate 20.

At this point, the detent plate 20 is rotated to the P range position at which a detent spring 25 can be inserted into a notch for P range, providing operation feeling to a driver.

When the detent plate 20 is rotated in this way, the following sequence is performed: the parking rod 30 connected to the detent plate 20 at the first end portion thereof moves forward thereof; the cam 33 placed on the second end portion of the parking rod 30 pushes the sprag 40 disposed in a nearby position; and the sprag 40 is rotated in one direction by the cam 33 and then engaged with a parking gear 50. Through the series of operations, the vehicle enters a parking state.

Meanwhile, when the transmission shift lever is manipulated to be shifted into a certain range other than P range, the detent plate 20 is rotated to a certain range position other than P at which the detent spring 25 is inserted into a notch for a certain range other than P range by the actuator 10.

Next, the parking rod 30 moves backward, and the 'U'-shaped stopper 35 connected to the second end portion of the parking rod 30 moves to surround the sprag 40, preventing the sprag 40 from being rotated.

That is, the stopper 35 prevents the sprag 40 from being rotated by vehicle vibrations, preventing the sprag 40 from being engaged with the parking gear 50, when the transmission shift lever is not positioned at P range. That is, the stopper 35 prevents ratcheting from occurring while driving of a vehicle. Furthermore, the stopper 35 prevents the parking rod 30, the sprag 40, and the parking gear 50 that are components of the vehicle parking apparatus from wearing due to impacts, improving the durability of the vehicle parking apparatus.

The parking rod 30 and the sprag 40 are disposed to be perpendicular to each other.

That is, the stopper 35 has the letter U shape and extends from the parking rod 30 in parallel with the rotation shaft 45 but in perpendicular to the sprag 40. Thus, when the transmission shift lever is not positioned at P range, the stopper 35 can effectively prevent the sprag 40 from being rotated about the rotation shaft 45.

The stopper 35 can be simply added to a parking rod 30 that is a component commonly used in conventional vehicle parking apparatuses. Therefore, the vehicle parking apparatus according to an exemplary embodiment of the present invention can be easily implemented without greatly changing the design of a conventional transmission.

Meanwhile, with reference to FIG. 3 and FIG. 4, the 'U'-shaped stopper 35 is formed such that the distance "d" between the opposite internal walls facing each other is preferably greater than the width "W" of the sprag 40.

This setting enables the sprag 40 to easily enter into the internal space of the stopper 35 when the transmission shift lever is not positioned at P range.

A difference between the distance "d" between the internal walls of the 'U'-shaped stopper 35 and the width "W" of the sprag 40 is set to be smaller than a predetermined distance that is a distance Δd between a first position at which the sprag 40 is completely released from the parking gear 50 and a second position at which the sprag 40 start to be engaged with the parking gear 50.

When the distance "d" between the internal walls of the stopper 35 is excessively greater than the width "W" of the sprag 40, the stopper 35 to which a vertical vibration is transferred cannot effectively prevent the rotation of the sprag 40, so ratcheting may occur. Therefore, the gap size between the stopper 35 and the sprag 40 is required to be smaller than the present distance to effectively prevent ratcheting.

On the other hand, when the detent plate 20 is rotated to the P range position, the stopper 35 moves to the foremost position in accordance with the movement of the parking rod 30, releasing the sprag 40. The parking rod 30 released from the stopper 35 is rotated in one direction by the cam 33 and is then engaged with the parking gear 50.

That is, as illustrated in FIG. 2, among the notches provided to the detent plate 20, the farthest notch from the sprag 40 corresponds to the notch for P range and is hereinafter referred to as a P range notch. When the detent plate 20 is rotated such that the detent spring 25 can be inserted into the P range notch, the parking rod 30 moves to the foremost position.

Therefore, when the transmission shift lever is shifted into P range, the sprag 40 can be released from the stopper 35 and engaged with the parking gear 50.

Meanwhile, as illustrated in FIG. 3, the stopper 35 has a cross section area that is greater than that of the second end portion of the parking rod 30, preventing the cam 33 from escaping from the parking rod 30.

That is, the stopper 35 not only can prevent the sprag 40 from being rotated when the transmission shift lever is positioned at a certain range other than P range but also prevent the cam 33 from escaping.

In addition, as illustrated in FIG. 2, a rear corner of an upper end portion of the sprag 40, the rear corner being pushed by the cam 33, and a front corner of a lower end portion of the sprag 40 are chamfered.

That is, when the transmission shift lever is shifted into P range, since the rear corner of the upper end portion of the sprag 40 is provided with a chamfer 43, the sprag 40 can be easily pushed by the cam 33 to be rotated. At this point, the sprag 40 needs to be released from the stopper 35. However, there may an event in which the sprag 40 cannot be smoothly released from the stopper 35 although the sprag 40 is pushed by the cam 33.

To solve this problem, the front corner of the lower end portion of the sprag 40 is also provided with a chamfer 43. Due to this chamfer 43, the sprag 40 can be easily released from the stopper 35 while being rotated to be engaged with the parking gear 50 when the transmission shift lever is shifted into P position.

A further description will be made for easier understanding of this operation. When the transmission shift lever is positioned at a certain range other than P range, as illustrated in FIG. 4, the sprag 40 stays disengaged from the parking gear 50 and the rotation of the sprag 40 is prevented by the stopper 35. Therefore, even when vertical vibrations of a vehicle occur, ratcheting does not occur.

Meanwhile, when the transmission shift lever is shifted into P range, as illustrated in FIG. 5, the sprag 40 is released from the stopper 35. Therefore, the sprag 40 is rotated and engaged with the parking gear 50, causing the vehicle to enter a parking state in which the rotation of the vehicle wheels is prevented.

FIG. 6 illustrates a state in which the parking rod 30 is pushed forward and the sprag 40 is released from the stopper 35.

According to the vehicle parking apparatus having the structure described above, even when severe vertical vibration of a vehicle occurs with the transmission shift lever at a certain range other than P range, a ratcheting event in which the sprag becomes engaged with the parking gear does not occur.

Therefore, abrasion or scratching of the sprag, the parking gear, and the cam is prevented and thus the durability of the parking apparatus is improved.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

The invention claimed is:

1. A vehicle parking apparatus comprising:
   a parking rod having a first end portion connected to a detent plate and a second end portion on which a cam is disposed, the parking rod rectilinearly moving in accordance with a rotation of the detent plate and causing the cam to rotate a sprag about a rotation shaft; and
   a 'U'-shaped stopper fixedly extending from the second end portion of the parking rod and operating to surround or release the sprag in accordance with a motion of the parking rod, the stopper allowing a rotation of the sprag by releasing the sprag when the detent plate is rotated to a P range position and preventing the rotation of the sprag by surrounding the sprag when the detent plate is rotated to a predetermined range position except the P range position,
   wherein the parking rod is disposed in a direction parallel with the rotation shaft of the sprag and in a direction perpendicular to the sprag.

2. The vehicle parking apparatus according to claim 1, wherein a distance between internal walls of the 'U'-shaped stopper, the internal walls facing each other, is greater than a width of the sprag.

3. The vehicle parking apparatus according to claim 2, wherein a difference between the distance between the internal walls of the 'U'-shaped stopper and width of the sprag is smaller than a predetermined distance that is a distance between a first position at which the sprag is fully disengaged from a parking gear and a second position at which the sprag starts to be engaged with the parking gear.

4. The vehicle parking apparatus according to claim 1, wherein, when the detent plate is rotated to the P range position, the stopper moves toward a furthest position from the sprag in accordance with the motion of the parking rod, and the sprag is released from the stopper and rotated in a direction by the cam, being engaged with the parking gear.

5. The vehicle parking apparatus according to claim 1, wherein the stopper has a cross section area in a width direction of the stopper greater than that of the second end portion of the parking rod in a width direction of the parking rod to prevent the cam from escaping from the parking rod.

6. The vehicle parking apparatus according to claim 1, wherein with reference to an angle of view of a part of the sprag adjacent to the cam looking down obliquely from above, a rear corner of an upper end portion of the sprag, the rear corner being a portion pushed by the cam, and a front corner of the upper end portion of the sprag are configured to be chamfered, respectively.

\* \* \* \* \*